July 19, 1960

J. W. WAY 2,945,693

REINFORCED BALL

Filed June 3, 1957

Jack W. Way,
INVENTOR.

BY

ATTORNEY.

July 19, 1960  J. W. WAY  2,945,693
REINFORCED BALL

Filed June 3, 1957  3 Sheets-Sheet 2

Jack W. Way,
INVENTOR.

BY

ATTORNEY.

July 19, 1960 — J. W. WAY — 2,945,693
REINFORCED BALL
Filed June 3, 1957 — 3 Sheets-Sheet 3

Jack W. Way,
INVENTOR.
BY.
ATTORNEY

United States Patent Office 2,945,693
Patented July 19, 1960

2,945,693

REINFORCED BALL

Jack W. Way, Garden Grove, Calif., assignor to W. J. Voit Rubber Corporation, Los Angeles, Calif., a corporation of California Filed June 3, 1957, Ser. No. 663,109

28 Claims. (Cl. 273—65)

The present invention relates to athletic balls and more particularly to inflatable or inflated balls, such as basket balls, footballs, soccer balls and volley balls, as well as other balls of either spherical or nonspherical configurations.

Athletic balls of the type described are generally made with an inflatable bladder surrounded by a wear-resistant cover. One method known to the prior art involves the formation of a precured rubber bladder wound with reinforcing cord and surrounded by a molded and vulcanized rubber cover. Balls made in this manner, as well as others made by various methods known to the prior art, involve fairly complex procedures which result in products containing elements which are not integrally or homogeneously united and which do not have that degree of dimensional stability and uniformity which may be desired.

It is, accordingly, an object of the present invention to provide a novel type of inflatable or inflated ball, as well as a method for the manufacture thereof.

A further object of the invention is to provide a ball which is relatively impervious to air loss and which is dimensionally stable and uniform, and which is also highly wear and weather resistant.

An additional object of this invention is to provide a simple and efficient method for the manufacture of inflated and inflatable balls having a uniform structure and possessing the desired characteristics of stability and wear resistance.

In accordance with the present invention, a reinforced ball of the type described is obtained by winding reinforcing cord about a bladder, either of conventional or having a special type of construction as described below, and thereafter applying and shaping thereover a cover of a fusible thermoplastic material which readily surrounds and flows between the reinforcing members and becomes united with the bladder, while at the same time forming a uniform covering having wear resistant characteristics. More particularly these results are achieved by utilizing as the covering material a solution or dispersion of a thermoplastic resin type of plastic material which is fused under elevated temperatures while being shaped in a mold. In a preferred form of the invention, the bladder itself is preformed of a thermoplastic material of the type of which the cover is formed so that upon fusion of the cover, integral bonding to the bladder will occur. At the same time the reinforcing layer becomes embedded within the fused cover.

Further details concerning the invention and various preferred embodiments thereof will be apparent from a consideration of the drawings and description which follow, by way of illustration and example only.

Figure 1:
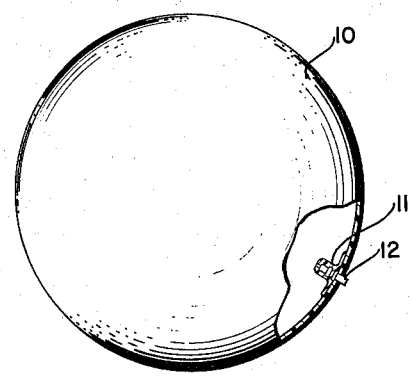
Figure 1 is a view partly in elevation and partly in cross-section of an inflated bladder utilized in the manufacture of the balls of the present invention.

As shown in Fig. 1, a bladder 10 has associated with it a valve 12 which is mounted or positioned through the wall of the bladder and supported by an enlarged portion 11 which is preformed and adhered to the inner surface of the bladder, or else may have been formed therein during the manufacture of the bladder. This bladder may be of conventional construction and composed of a preformed, vulcanized rubber material formed in a mold. The bladder may also have been made by rotational casting of latex followed by vulcanization. A preferred type of bladder construction is obtained by the rotational casting of a vinyl plastisol in a heated mold to form a spherical bladder member. An alternative bladder construction may be of injection molded hemispherical shells of a plastic, such as a polyvinyl chloride compound, which are joined together to form the spherical bladder. This modification is described further in connection with Fig. 6.

Figure 2:
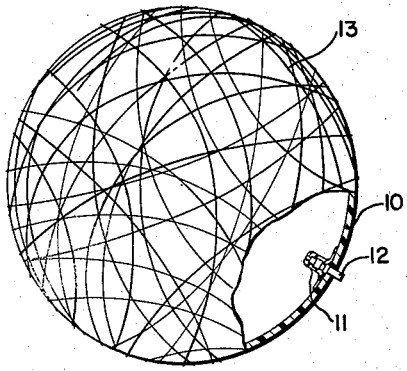
Fig. 2 is a view partly in elevation and partly in cross-section of the bladder of Fig. 1 with a cord reinforcing layer wound around it.

As shown in Fig. 2, bladder 10 receives a reinforcing wrapping composed of turns or windings of reinforcing cord or thread 13 wound in approximately great circles about the bladder. The reinforcing material may be of any desired composition, such as nylon thread or cord, or cotton, rayon or other known textile cords, yarns or threads.

Figure 3:
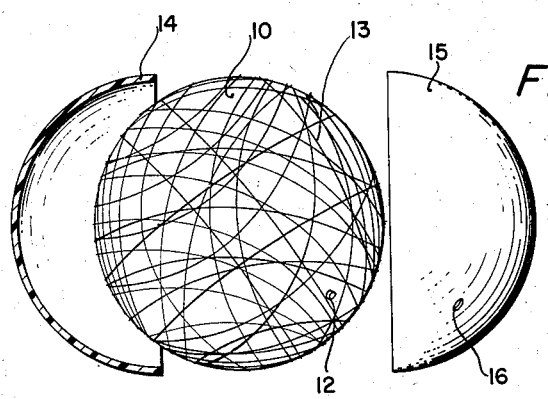
Fig. 3 is a view in elevation partly in cross-section showing a preformed cover in a preliminary stage of manufacture as it is about to be applied to the reinforced bladder of Fig. 2.
Figure 4:
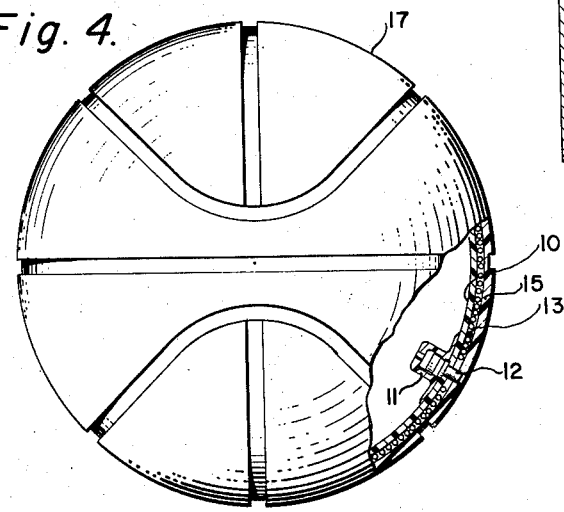
Fig. 4 illustrates in elevation and partly in cross-section a completed molded ball made in accordance with the present invention.

Bladder 10 with its reinforcing layer 13 applied thereto is then covered, as illustrated in Fig. 3, by applying an outer cover of a thermoplastic material, such as polyvinyl chloride. In the modification illustrated in Fig. 3, the cover is composed of two preformed, hemispherical segments 14 and 15, the latter of which is provided with opening 16 through which the valve member 12 will be inserted when the two segments are applied over the bladder with its reinforcing covering. These segments may be preformed by injection molding them in molds to form preformed shells of the vinyl plastic or these segments may be preformed by casting vinyl plastisols, organosols or plastigels in suitable molds. Alternative coating methods are illustrated in, and will be discussed in connection with Figs. 6 and 7. In the final step for the manufacture of the ball, the assembly of Fig. 3 which consists of the bladder, the reinforcing winding and the two hemispherical segments surrounding the bladder and winding, is introduced into a two-part mold designed to surround the assembly. Sufficient air pressure is applied to the interior of the bladder by means of valve 12 which is connected to an air connection in the mold to enable the desired amount of pressure to be applied to the cover to cause it to conform to the pattern which may be formed on the interior surface of the mold and also to cause the material of which the cover is made to flow around and through the winding, thereby embedding the winding in the material of the cover and enabling a firm bond to take place between the bladder and the material of which the cover is formed. In view of the thermoplastic nature of the cover material, it will tend to flow freely under pressure to obtain a uniform embedment of the cord. Where the cover is of a polyvinyl chloride organosol or plastisol, temperatures in the range of about 350° F. are sufficient to cause the material to flow and also at the same time cause gelation of the plastic through solution of the polyvinyl chloride and plasticizer contained in the formulation. The final product is illustrated in Fig. 4 in which ball 17 is shown with bladder 10, valve 12, winding 13 and cover 15 all assembled into a unitary structure.

Vinyl plastisols are colloidal dispersions of polyvinyl chloride resins in suitable plasticizers. Upon heating to a suitable temperature, depending generally on the nature of the resin or the plasticizer, or both, fusion of the resin occurs accompanied by solution with the plasticizer, and solidification of the resin composition then takes place with the desired properties of the formulation being obtained by the resulting blending of the ingredients. Other compounding and modifying ingredients may be incorporated into the dispersion, such as stabilizers, pigments, fillers and the like. A modified type of plastisol is called an organosol in which an organic solvent is added to the dispersion to improve flow properties and other characteristics. Plastisols may also be modified by the addition of thinners to improve flow properties and modify the viscosity of the dispersion. These plastisols and their modifications are generally known as vinyl dispersions. These dispersions may be utilized in carrying out the process of this invention in various ways. For example, in preforming bladders in one piece in a closed mold, slush molding or rotational casting methods may be utilized. In these operations the plastisol is coated upon the inner surface of the mold in a manner which will provide a uniform layer, and the mold is then heated to effect gelation or solidification of the composition. A preheated mold may be filled with plastisol and then emptied. A layer of plastisol will remain upon the inner surface, depending upon the temperature of the mold and the viscosity of the plastisol. The mold is then heated to fusion temperature, cooled, and the finished bladder then removed. This procedure is known as slush molding.

A similar procedure may be followed starting with a cold mold in what is known as the two pour method. Another very satisfactory method which gives uniform layers is the rotational molding or casting method in which the mold is filled with a predetermined quantity of plastisol and, after closing, is heated while being rotated through a number of planes to distribute the plastisol evenly on the inner surface of the mold. The heating causes fusion of the resin and solidification of the composition. After partial cooling, the mold is opened and the product removed. Procedures of these types are effective in producing preformed, one-piece bladders as used in the construction illustrated in Figs. 1 and 2. Preformed hemispherical cover segments of the type shown in Fig. 3 may also be obtained in this manner by first forming a spherical member and then cutting into two segments, so that these may be applied over the bladder and reinforcing cord assembly before the final molding operation.

Figure 6:
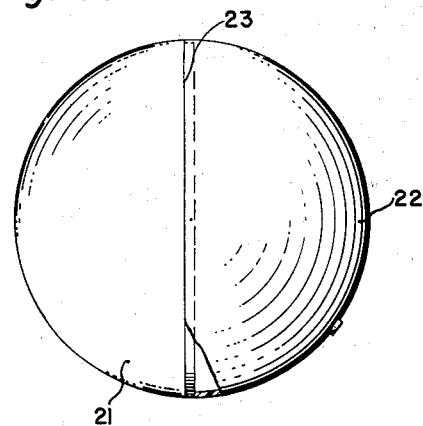
Fig. 6 is a view partly in elevation and partly in cross-section of a bladder formed in a modified manner.

Another technique in which vinyl dispersions may be utilized in the invention described herein is by casting in the conventional manner. In accordance with such methods, vinyl dispersions are introduced into molds of the desired configuration, followed by heating to cause solidification of the resin, after which the molded product may be readily removed after the molds have cooled sufficiently. This procedure may be used for making bladders in the method which is illustrated in Fig. 6 wherein hemispherical segments are formed by casting in molds, and these segments are then assembled as described above. Hemispherical segments of the type illustrated in Fig. 3 for use in forming the covers may also be made in the same manner. Instead of utilizing vinyl dispersions, these segments can also be made by molding solid polyvinyl chloride resins in the form of powder or granules, by conventional pressure molding methods such as by injection or transfer molding or the like. The hemispherical segments for the bladder or the cover may also be preformed by vacuum forming.

Figure 5:
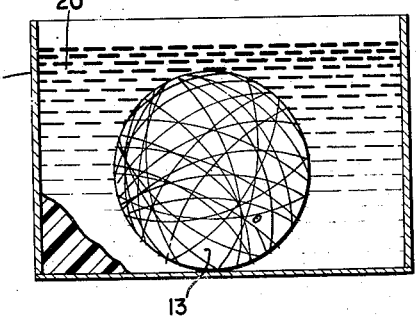
Fig. 5 is a view partly in cross-section and partly in elevation of an alternative method of applying a coating or cover to the reinforced bladder prior to final molding or shaping of the ball.

Vinyl dispersions lend themselves admirably to coating by dipping processes. In such a procedure the article is immersed in the dispersion and then heated to cause fusion and gelation of the resin. In this modification as illustrated in Fig. 5, the assembly of Fig. 2 is dipped into a body of vinyl plastisol, or the like, 20 contained in tank 19, with the result that upon removal a layer of the plastisol has been deposited upon the assembly. Instead of immersion, the dispersion may be brushed or sprayed on. In applying this procedure to the present method, the coated assembly obtained from the dipping operation illustrated in Fig. 5 is introduced into a split mold and heated while under sufficient pressure to cause the desired degree of flow and gelation of the thermoplastic material, thus resulting in the integral and homogeneous product described above. Solutions or dispersions of thermoplastic resins of the type described may be sprayed, brushed, dipped, or otherwise applied to the cord layer to saturate the cord and bond it to the bladder prior to the application of intermediate or final cover layers by any of the methods described herein.

In the modification of the bladder construction illustrated in Fig. 6, two hemispherical bladder segments 21 and 22 are preformed by casting or molding, and then joined with their edges joined in a joint 23. Adhesive may be used to join the edges if it is a butt joint, or a slightly overlapping joint plus adhesive may be utilized, as illustrated. Such segments may be produced by injection, transfer, or compression molding with conventional vinyl or other thermoplastic molding compositions, rather than by the use of plastisols as described above. The winding may then be applied and the remaining steps followed through, as in the case of the form of the invention described in Figs. 1 to 3. During the final heating and molding step, the segments will become integrally bonded.

Figure 7:
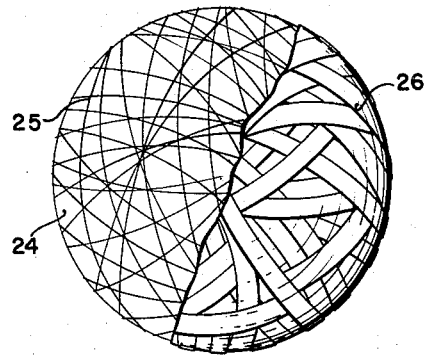
Fig. 7 is a view in perspective showing an assembled ball prior to molding with a portion of the outer cover removed in a modified form of the invention.
Figure 8:
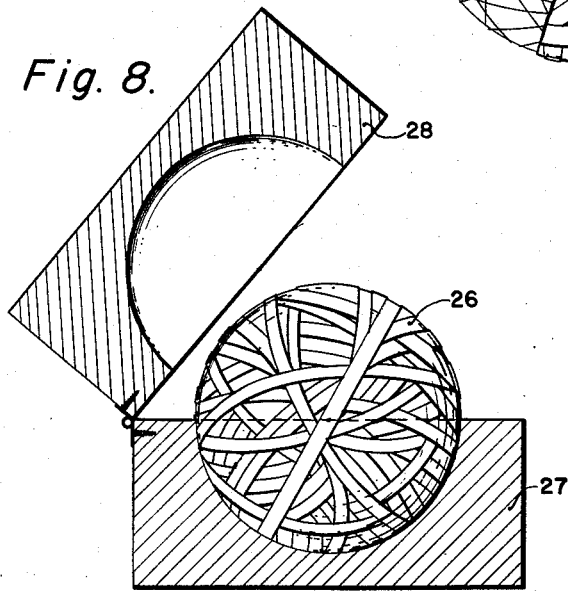
Fig. 8 is a view in elevation showing the ball of Fig. 7 positioned in a mold.

Instead of utilizing preformed segments or dipping for the cover layer, the bladder with its cord winding may be wrapped with tape of vinyl or other thermoplastic material, as illustrated in Fig. 7, wherein bladder 24, with cord 25 thereon is wrapped with a layer of vinyl tape 26. The resulting assembly is then introduced into a two-part mold as shown in Fig. 8 at 27, 28, and after the mold is closed and heat applied, the tape fuses into a cover which embeds the windings and bonds to the bladder to produce a product similar to that shown in Fig. 4.

While the foregoing description refers particularly to the use of polyvinyl chloride resins as desirable thermoplastic material in connection with the product and method described above, other thermoplastic resins may also be utilized to produce an integral and homogeneous product such as is described herein.

Figure 9:
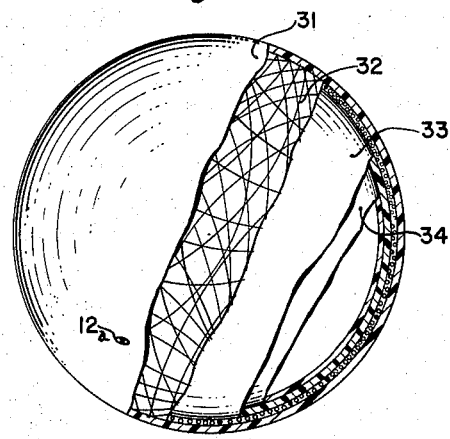
Fig. 9 is a view in elevation partly in cross-section of a modified ball construction.

In the modified form of the invention illustrated in Fig. 9, a bladder 34, which may be preformed by rotational casting of a vinyl plastisol as in Fig. 1, or which may have been formed of preformed molded segments as in Fig. 6, is then surrounded with an intermediate layer or cover 33. This layer may be applied as preformed hemispherical segments of polyvinyl chloride or other thermoplastic material similar to those forming the bladder or similar to the cover illustrated in Fig. 3. Alternatively, this layer may be applied by dipping in a polyvinyl chloride plastisol or solution, or by spraying or otherwise. Preferably this layer is selected to have a slightly lower softening temperature than the bladder. Cord layer 32 is then applied over this intermediate cover. At this point the assembly is placed into a mold cavity of the corresponding size and shape, and is heated to the point where the intermediate layer 33 softens and flows through and embeds the cord layer. The assembly is then cooled and removed from the mold. An outer cover layer 31 of thermoplastic material is then applied. This layer may be in the form of preformed segments also, or may be applied as a dip, spray or tape in the manner described above. The assembly is then placed in another mold cavity having the size and shape of the final product and again heated to cause the cover to fuse to the under layer and become integrally united thereto. Air under pressure is introduced through valve 12a to create the necessary pressure against the mold surface. This may be accomplished by means of an inlet opening communicating with the valve, into which the nozzle of an air line may be inserted.

Figure 10:
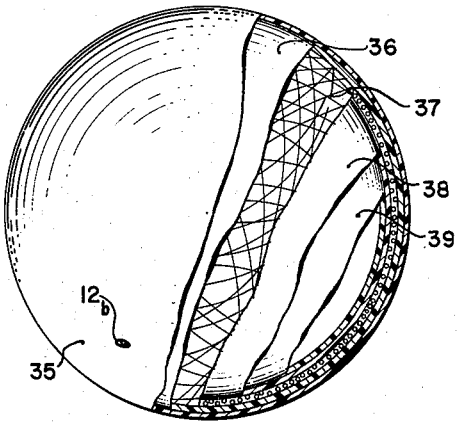
Fig. 10 is a view in elevation partly in cross-section of another form of ball construction.

In the modified form of the invention illustrated in Fig. 10, a procedure similar to Fig. 9 is followed utilizing a bladder 39, an intermediate cover 38, cord layer 37 but with a second intermediate cover 36. Layers 36 and 38 preferably have a lower softening point than the bladder, and the entire assembly is heated in a mold to cause unification of the layers prior to application of the final outer cover 35. Air is introduced by means of valve 12b.

Figure 11:
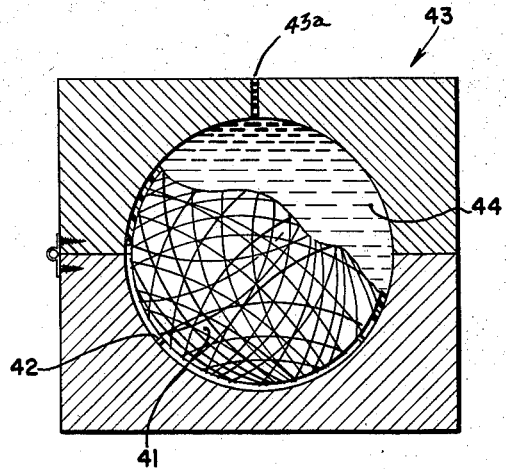
Fig. 11 is a view in cross-section partly in elevation of another method utilized in forming the ball.
Figure 12:
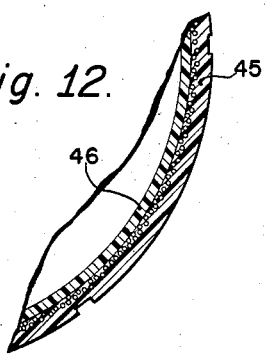
Fig. 12 is a view in transverse cross-section of the product obtained in accordance with the procedure illustrated in Fig. 11.

Another method of forming the ball is illustrated in Figs. 11 and 12. A cord covered bladder assembly 41, which may be fabricated in any manner such as is described above, is introduced into a two-part mold 43. The cavity conforms to the final size of the ball and is larger than 41 which is maintained concentric within the mold by spacing pins 42 which are distributed to hold the assembly in the proper position. The material 44 of which the ball cover is to be formed is then introduced into the mold cavity through opening 43a. This material may be in the form of a polyvinyl chloride liquid plastisol and may be forced around the ball as shown, or the cover material may be a thermoplastic molding compound forced into the cavity by injection or transfer molding. The cover compound must be sufficiently fluid to flow completely around the ball. Of course the material may be introduced through a plurality of openings rather than just one. The mold is then heated in the usual manner and a product conforming to the mold cavity is obtained thereby. Suitable vent openings for the escape of air and other gases are provided, as is usual in molding procedures of this type.

The various forms and embodiments of the invention described above are for purposes of illustration only, and other modifications within the scope of the invention may be apparent to those skilled in the art and such modifications are intended to lie within the scope of the appended claims.

The inventor claims:

1. An athletic ball comprising a bladder, a reinforcing layer comprising windings of cord or thread surrounding the bladder, and a wear resistant cover therefor, said bladder, reinforcing layer and cover being joined together to form a uniform, unitary and integral assembly, said bladder and said cover being composed of layers of a thermoplastic synthetic resin bonded together by fusion of each to the other with said reinforcing layer being embedded therebetween.

2. An athletic ball according to claim 1 wherein the bladder and cover comprise a polyvinyl chloride resin.

3. A method for the manufacture of an athletic ball which comprises preforming a bladder member composed of a thermoplastic synthetic resin, wrapping said bladder with a layer of reinforcing material, surrounding the reinforced bladder with a layer of thermoplastic synthetic resin, and subjecting the resulting assembly to elevated temperatures while confined in a shaping mold to cause plastic flow of said thermoplastic layer and fusion thereof with the surface of said bladder and embedment of said reinforcing member therein.

4. A method according to claim 3 wherein the reinforcing member is composed of windings of reinforcing cord or thread.

5. A method according to claim 4 wherein the thermoplastic resin is a polyvinyl chloride.

6. A method according to claim 5 wherein the thermoplastic resin comprises a polyvinyl chloride plastisol and wherein heating is sufficient to cause fusion and flow of the resin composition and gelation thereof.

7. A method according to claim 3 wherein the bladder is preformed in one piece by slush molding of a polyvinyl plastisol containing composition.

8. A method according to claim 3 wherein the bladder is preformed in one piece by rotational casting of a polyvinyl plastisol containing composition.

9. A method according to claim 3 wherein the bladder is preformed by casting of a polyvinyl resin to hemispherical segments which are joined together prior to the application of the reinforcing member and the cover.

10. A method according to claim 3 wherein the cover layer is applied by coating the reinforced bladder assembly with a layer of a polyvinyl chloride dispersion.

11. A method according to claim 3 wherein the cover layer is applied in the form of a pair of preformed hemispherical segments composed of polyvinyl chloride resin.

12. A method according to claim 3 wherein the cover layer is applied in the form of windings of a thermoplastic tape surrounding the cord on the bladder, and wherein said tape is fused to form the cover during the shaping operation.

13. A method according to claim 3 wherein a preformed intermediate layer of thermoplastic material is applied over the bladder member prior to the application of the reinforcing material.

14. A method for the manufacture of an athletic ball which comprises preforming a bladder member of flexible, resilient thermoplastic material, surrounding said bladder with a layer of cord reinforcing material, introducing the reinforced bladder assembly into a closed mold having the size and shape of the final ball, said assembly being positioned within said mold and uniformly spaced from the walls thereof, surrounding said assembly while confined in said mold with a layer of flexible, resilient thermoplastic material, and subjecting the contents of the mold to elevated temperatures to cause flow of the thermoplastic material accompanied by fusion of the thermoplastic layer to the bladder and thereby embedding the reinforcing material therebetween.

15. A method according to claim 14 wherein the thermoplastic cover material is introduced into said mold under pressure in a fluid state.

16. A method according to claim 15 wherein the thermoplastic material of which the bladder and cover are formed comprises polyvinyl chloride.

17. A method according to claim 16 wherein the polyvinyl chloride cover material is introduced in the form of a plastisol which is gelled by heating after the mold cavity is filled.

18. A method according to claim 16 wherein the polyvinyl chloride cover material is introduced in the form of a heated molding composition and allowed to solidify by cooling after the mold cavity is filled.

19. An athletic ball construction comprising a bladder member formed of flexible, resilient thermoplastic material, a first layer of flexible, resilient thermoplastic material applied thereover, a layer of cord reinforcing material applied to said layer, a second layer of flexible, resilient thermoplastic material applied over said cord layer, and a cover layer of flexible, resilient thermoplastic material applied over said second layer, all of said layers and said bladder being integrally united by fusion thereof with said cord layer being embedded between said first and second layers.

20. An athletic ball construction according to claim 19 wherein said thermoplastic material comprises polyvinyl chloride.

21. An athletic ball construction comprising a bladder member of flexible, resilient thermoplastic material, a layer of similar material applied thereto, a layer of cord reinforcing material embedded in said layer, and a cover layer of flexible, resilient thermoplastic material applied to said first-named layer, each of said layers and said bladder being integrally united by fusion to the respective adjacent layer.

22. A method for the manufacture of athletic balls which comprises preforming a bladder member of flexible, resilient thermoplastic material, applying a first layer of similar material to said bladder, applying a layer of cord reinforcing material over said first-named layer, subjecting the resulting assembly to heat to cause surface fusion of said first-named layer to said bladder and embedment of said cord layer in said first-named layer, thereafter applying a cover layer of thermoplastic material over the embedded cord layer, and subjecting the resultant assembly to heat to cause fusion bonding of said cover member to said embedded cord layer.

23. A method according to claim 22 wherein a layer of thermoplastic material is applied over the embedded cord layer and bonded thereto by fusion prior to the application of the cover layer.

24. A method for the manufacture of athletic balls which comprises preforming a bladder member of flexible resilient thermoplastic resin, applying a layer of cord reinforcing material over said bladder member, applying thermoplastic resinous material in liquid form over the surface of said reinforced bladder member thereby impregnating said cord and coating the exposed surface of said bladder therewith, applying a cover layer of thermoplastic resinous material over said impregnated cord layer, positioning the resulting assembly within a mold, and applying pressure and elevated temperatures thereto while in said mold to cause the thermoplastic material of the cover and that which impregnates the cord and covers the bladder to unite by fusion to each other and to the surface of the bladder thereby integrally uniting said thermoplastic material and embedding said cord therein.

25. The method according to claim 24 wherein the thermoplastic resinous material comprises polyvinyl chloride.

26. A method for the manufacture of an athletic ball which comprises preforming an inflatable bladder member, wrapping said bladder with a layer of reinforcing cord, impregnating said cord layer with a thermoplastic synthetic resin, surrounding the reinforced and impregnated reinforcing layer with a layer of thermoplastic synthetic resin, confining the resultant assembly in a mold and subjecting it to elevated temperatures sufficient to cause plastic flow of said thermoplastic resins while introducing gas under pressure interiorly of the bladder to force the assembly outwardly against the wall of the mold and thereby causing fusion of the thermoplastic synthetic resin which impregnates the cord with that which surrounds said cord layer and embedment of said reinforcing member within said thermoplastic resin to form a unitary assembly of reinforcing material and cover material surrounding and bonded to said bladder.

27. An athletic ball comprising a gas-filled bladder of flexible resilient material having a surface comprising a first thermoplastic resinous material, a reinforcing layer comprising windings of cord or thread surrounding the bladder, said reinforcing layer being impregnated with a second thermoplastic resin coating and surrounding said windings and impregnating the interstices therebetween, and an outer layer of a third thermoplastic resinous material surrounding said windings and the resinous coating thereon, all of said resinous materials being compatible with each other and bonded together by fusion of each to the other to form a uniform unitary and integral assembly with said reinforcing layer embedded in thermoplastic resinous material between said bladder and said outer layer.

28. An athletic ball according to claim 27 wherein said thermoplastic resinous material comprises polyvinyl chloride.

References Cited in the file of this patent

UNITED STATES PATENTS

| 2,035,774 | Trobridge et al. | Mar. 31, 1936 |
| 2,061,604 | Winterbauer | Nov. 24, 1936 |
| 2,300,441 | Voit et al. | Nov. 3, 1942 |
| 2,302,985 | Voit et al. | Nov. 24, 1942 |
| 2,352,872 | Voit et al. | July 4, 1944 |
| 2,473,722 | Nelson | June 21, 1949 |
| 2,706,514 | Anderson | Apr. 19, 1955 |
| 2,761,684 | Crowley et al. | Sept. 4, 1956 |

FOREIGN PATENTS

| 143,563 | Australia | Sept. 25, 1951 |